(12) United States Patent
Inoue et al.

(10) Patent No.: US 6,627,293 B1
(45) Date of Patent: Sep. 30, 2003

(54) MAGNETIC RECORDING MEDIUM (75) Inventors: Makoto Inoue, Miyagi (JP); Akiko Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 09/663,091

(22) Filed: Sep. 15, 2000

(30) Foreign Application Priority Data

Sep. 16, 1999 (JP) .......................................... P11-262685

(51) Int. Cl.$^7$ ................................................ G11B 5/733
(52) U.S. Cl. ...................... 428/141; 428/323; 428/329; 428/336; 428/694 BS
(58) Field of Search ................................ 428/323, 329, 428/336, 141, 694 BS, 900

(56) References Cited

U.S. PATENT DOCUMENTS 6,287,668 B1 * 9/2001 Hayashi et al. ............. 428/141

FOREIGN PATENT DOCUMENTS

| EP | 0 924 690 | * | 6/1999 |
| JP | 11 073 629 | * | 3/1999 |
| JP | 11 102 513 | * | 4/1999 |
| JP | 11242812 | * | 9/1999 |

OTHER PUBLICATIONS

Mitsubishi Chemical—Data Sheet Medium Color Furnace Carbon Blacks.*

* cited by examiner

Primary Examiner—Stevan A. Resan
(74) Attorney, Agent, or Firm—Sonnenschein, Nath & Rosenthal LLP (57) ABSTRACT

The present invention provides a magnetic recording medium comprising a non-magnetic support body coated with a lower undercoat layer formed from a non-magnetic paint prepared by kneading at least a binder and a non-magnetic powder and an upper magnetic layer formed on the lower undercoat layer, from a magnetic paint prepared by kneading at least a binder and a magnetic powder, wherein the non-magnetic powder includes a non-magnetic pigment whose surface has an area coated with graphite-shaped crystal of carbon black. The lower undercoat layer arranged under the magnetic layer has a preferable surface characteristic and an excellent electric conductivity, and the magnetic layer formed as a thin film has a preferable electromagnetic conversion characteristic.

1 Claim, 3 Drawing Sheets

MAGNETIC RECORDING MEDIUM

BACKGROUND OF THE INVENTION

1. Field of the Invention

The present invention relates to a magnetic recording medium including a lower undercoat layer and an upper magnetic layer formed in this order on a non-magnetic support body and in particular, to a magnetic recording medium having a non-magnetic powder in a lower non-magnetic layer.

2. Description of the Related Arts

As the magnetic recording medium, there are known various formats for audio and video and computer peripheral apparatuses such as a high-density floppy disc and a backup data cartridge. The magnetic recording medium is expected to have a higher density and those using metal fine particles as the magnetic powder are now becoming the main stream.

In this magnetic recording medium, as the technique for realizing a high density, various methods are considered such as increasing the coercive force of the magnetic powder and reducing the film thickness of the magnetic paint film so as to suppress the output loss. Furthermore, in order to realize a high-density recording, the magnetic recording medium should have a highly smoothed surface so as to minimize the spacing loss.

In order to simultaneously achieve the reduced thickness and flatness of the magnetic layer, for example, there is a so-called simultaneous double coating method in which a lower non-magnetic layer and an upper magnetic layer are simultaneously formed on the non-magnetic support body. This simultaneous double coating enables to prepare a magnetic recording medium having an excellent surface and a thin-film magnetic layer.

However, in this simultaneous double coating method, the surface characteristics of the upper magnetic layer and the lower non-magnetic layer respectively depend on the coating paint characteristics. For example, as is disclosed in Japanese Patent Publication 8-203060, when the non-magnetic paint and the magnetic paint have physical properties which are greatly different from each other, defects such as a paint seam, color irregularities, and thickness irregularities are easily caused.

Moreover, in the simultaneous double coating method, in order to obtain a highly smoothed upper magnetic layer, the lower non-magnetic layer should be formed so as to have an excellent surface. Accordingly, when forming the lower non-magnetic layer, it is necessary to prepare a lower layer paint in which fine particles of a non-magnetic pigment are preferably dispersed.

Furthermore, in the post processing after the paint coating (such as a calendar process, a back-coat formation process, and a slit processing), when the magnetic recording medium has a high electric resistance, electric charge may cause attachment of the magnetic recording medium and defective running, resulting in a breakage and deterioration of the shape. Moreover, when the magnetic recording medium is charged with a high electric resistance, a discharge noise is generated and dusts drawn to the magnetic recording medium deteriorate the electromagnetic conversion characteristic and the running durability. Especially a flexible disc or the like easily gets charged because of sliding with a so-called liner and shell, which generates a noise and a off-track with a high frequency.

In order to reduce the electric resistance of the paint film, a conductive material is used as the non-magnetic pigment constituting the lower non-magnetic layer and a carbon black or the like is added to the lower non-magnetic layer.

From the viewpoint of the electric resistance reduction effect in the magnetic recording medium as well as the costs, the carbon black is preferable as the non-magnetic pigment to be added to the lower non-magnetic layer. However, the carbon black absorbs a large amount of liquid and cannot achieve a uniform dispersion, greatly increasing the paint viscosity. For this, when carbon black is added to the lower layer paint, it is difficult to preferably control the surface of the lower non-magnetic layer and accordingly, it is impossible to highly smooth the upper magnetic layer.

SUMMARY OF THE INVENTION

It is therefore an object of the present invention to provide a magnetic recording medium including a lower undercoat layer which is provided under a magnetic layer and has a preferable surface and an excellent electro-conductivity, and a magnetic layer which is formed as a thin film and has an excellent electromagnetic conversion characteristic.

The magnetic recording medium according to the present invention which has achieved aforementioned object includes a non-magnetic support body coated with a lower undercoat layer formed from a non-magnetic paint prepared by kneading at least a binder and a non-magnetic powder and an upper magnetic layer formed on the lower undercoat layer, from a magnetic paint prepared by kneading at least a binder and a magnetic powder, wherein the non-magnetic powder includes a non-magnetic pigment whose surface has an area coated with graphite-shaped crystal of carbon black.

In the magnetic recording medium having the aforementioned configuration according to the present invention, the non-magnetic pigment in the lower undercoat layer is subjected to surface processing by the graphite-shaped crystal of carbon black and accordingly, the non-magnetic powder has an electric conductivity. Thus, the magnetic recording medium can reduce the electric resistance in the paint films formed on the non-magnetic support body. Furthermore, in this magnetic recording medium, the non-magnetic powder has an excellent dispersion characteristic and accordingly, the lower undercoat layer has a preferable surface characteristic.

DETAILED DESCRIPTION OF PREFERRED EMBODIMENTS

Description will now be directed to a magnetic recording medium according to a preferred embodiment of the present invention with reference to the attached drawings.

Figure 1:
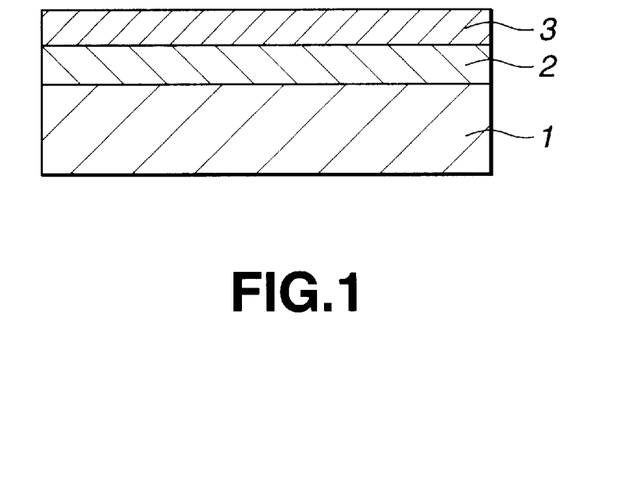
FIG. 1 is a cross sectional view of an essential portion of an example of a magnetic recording medium according to the present invention.

As shown in FIG. 1, the magnetic recording medium according to the present invention includes a non-magnetic support body 1, a lower non-magnetic layer 2 arranged on one main surface of the non-magnetic support body 1, and an upper magnetic layer 3 arranged on the lower non-magnetic layer 2.

The non-magnetic support body 1 may be formed, for example, using polyethylene terephthalate, polyethylene 2, 6-naphthalate, and other polyesters, polyethylene, polypropylene, and other polyolefines, cellulose triacetate and other cellulose derivatives, polycarbonate, polyimide, polyamide, and other plastics or plastics deposited by a metal such as aluminum. Moreover, the shape of the non-magnetic support body 1 may be a film shape, tape shape, or a sheet shape. Furthermore, the non-magnetic support body 1 is formed by a material selected from the aforementioned materials according to its shape. Moreover, the non-magnetic support body 1 may be have a single layer or multiple layers. Moreover, for example, one main surface of the non-magnetic support body may be subjected to a surface processing such as corona discharge processing or may be covered by an organic material layer which can easily be adhered.

The lower non-magnetic layer 2 is formed by coating the non-magnetic support body 1 with a non-magnetic paint containing as main contents a non-magnetic powder and a binder.

The non-magnetic powder is a non-magnetic pigment whose surface has an area coated with carbon black in a graphite-shaped crystal state. More specifically, the non-magnetic powder is made from needle-shaped hematite ($\alpha$-$Fe_2O_3$) as the non-magnetic pigment and carbon black is mechanochemically reacted with the surface of the needle-shaped hematite. Hereinafter, the non-magnetic powder prepared by a mechanochemical reaction of carbon black on the surface of the needle-shaped hematite will be referred to as hybrid particles.

The non-magnetic pigment is not limited to the needle-shaped hematite ($\alpha$-$Fe_2O_3$) but any material that can be mechanochemically reacted with carbon black. The needle-shaped hematite ($\alpha$-$Fe_2O_3$) is a very fine powder having a uniform particle size and accordingly, it is preferable as the non-magnetic pigment.

The hybrid particle size and specific area basically depend on the non-magnetic pigment as the basic material. The non-magnetic pigment is preferably a fine particle. More specifically, the needle-shaped hematite preferably has a BET specific area of 20 $m^2/g$ to 100 $m^2/g$ and more preferably in a range 40 $m^2/g$ to 70 $m^2/g$. When the BET specific area is in the range of 20 $m^2/g$ to 100 $m^2/g$, the hybrid particles have an excellent dispersion characteristic in a non-magnetic paint. For this, by using the needle-shaped hematite particles having the BET specific area of 20 $m^2/g$ to 100 $m^2/g$, the lower non-magnetic layer 2 can have an excellent surface characteristic.

Moreover, the needle-shaped hematite preferably has a longer diameter (size in the longitudinal direction of a needle-shaped hematite particle) in a range of 0.05 $\mu$m to 1.0 $\mu$m. When the longer diameter is in the range of 0.05 $\mu$m to 1.0 $\mu$m, the hybrid particles can have an excellent dispersion characteristic in a non-magnetic paint. For this, by using the needle-shaped hematite particles having a longer diameter in the range of 0.05 $\mu$m to 1.0 $\mu$m, the lower non-magnetic layer 2 can have an excellent surface characteristic.

The needle-shaped hematite particles can be prepared by using a conventional known method. That is, the needle-shaped hematite particles can be obtained as an intermediate material when producing iron oxide magnetic powder. More specifically, aqueous solution of ferrous salt is oxidized by air under presence of alkali so as to grow a needle-shaped crystal of hydrated iron oxide and then the needle-shaped crystal is dehydrated and sintered to obtain needle-shaped hematite particles. When the needle-shaped hematite is to be used in the lower non-magnetic layer 2, sintering is performed at a comparatively high temperature so as to obtain particles having a smaller number of surface pores. Thus, it is possible to prepare the needle-shaped hematite particles having a small BET specific area as has been described above.

The carbon black constituting the hybrid particles may any of the conventional known types of carbon black. The carbon black is preferably fine particles. More specifically, by using a carbon black of a low-structure configuration, it is possible to improve the coating film strength of the lower non-magnetic layer 2. In other words, in order to improve the coating film strength of the lower non-magnetic layer 2, it is preferable to use a carbon black of a low-structure configuration.

More specifically, the carbon black preferably has a particle diameter of 80 nm or below and a DBP oil absorbing amount is 180 ml/100 cc or below. By using a carbon black having the particle diameter of 80 nm or below and the DBP oil absorbing amount of 180 ml/100 cc or below, the hybrid particles can have conductivity with sure, the lower non-magnetic layer 2 can have a smooth and flat surface, and the lower non-magnetic layer 2 can have an improved coating film strength.

On the contrary, when the carbon black has a developed structure configuration, the hybrid particles can be conductivity by using a small amount. That is, by using a carbon black having a developed structure configuration, it is possible to reduce the electric resistance of the lower non-magnetic layer 2 with a small amount of carbon black.

When preparing hybrid particles, an apparatus capable of mechanochemical processing in a dry powder/powder system is used for a carbon black powder and $\alpha$-$Fe_2O_3$ powder. More specifically, when preparing hybrid particles, the carbon black is crushed in a mixing apparatus having a high shear such as a so-called hybridizer and then mechanochemically attached to the surface of the $\alpha$-$Fe_2O_3$ particles. It should be noted that the hybrid particles may be prepared, for example by using a simple apparatus such as an automatic mortar.

Here, the mechanochemical processing represents means for forming a composite material by a chemical reaction caused by charging, attachment, friction heat, and breakage caused when powders are forced to be in contact with each other by a mechanical force. Generally, in the mechanochemical processing, a particle surface is coated with other material so as to obtain a new function, a so-called composite particle. Especially in the aforementioned hybrid particles, the graphite-shaped crystal of the carbon black crushed by the mechanochemical processing covers at least a part of the surface of hematite particles. It should be noted that in this mechanochemical processing, it is possible to use a coupling agent and apply temperature so that the carbon black firmly adheres to the surface of the hematite surface.

In the mechanochemical processing for preparing hybrid particles, the amount of the carbon black is preferably in the range of 10 wt % to 40 wt % with respect to the hematite fine particles. When the amount of the carbon black is below 10 wt %, the hybrid particles may not have sufficient electric resistance reduction effect. On the contrary, when the amount of the carbon black exceeds 40 wt %, the lower layer non-magnetic layer 2 may not have a preferable surface characteristic.

The hybrid particles differ in the electric resistance reduction effect depending on the primary particle size and the structure. Accordingly the amount to be added with respect to a binder is determined considering the surface characteristic and the electric resistance reduction effect.

The binder may be any of those conventionally used as binders of the magnetic recording medium. Especially preferable are those containing a hydrophilic polar group in the polymer chain. As the polar group, it is possible to use sulfonic group, sulfuric ester group, carboxylic acid group, and its salt, tertiary amine group, quaternary ammonium base, phosphoric acid group, phosphoric ester group, and the like. Especially effective are sulfonic group, alkali metal salt of sulfuric ester group, quaternary ammonium base, and the like.

As the polymer chain, there can be exemplified vinyl chloride-vinyl acetate copolymer, vinyl chloride-vinyl acetate-maleic acid copolymer, vinyl chloride-vinylidene chloride copolymer, vinyl chloride-acrylonitrile copolymer, acrylic ester-acrylonitrile copolymer, acrylic ester-vinylidene chloride copolymer, methacrylic acid ester-vinylidene chloride copolymer, methacrylic acid ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, polyacetal, cellulose derivative, styrene-butadiene copolymer, polyester resin, phenol resin, epoxy resin, polyurethane resin, urea resin, melamine resin, alkyd resin, urea-formaldehyde resin, or mixture of these materials.

Moreover, it is possible to further improve the durability or the like when the lower non-magnetic layer 2 contains as a bridging agent 3-functional group isocyanate compound such as a reaction product of trimethylolpropane 1 [mol] and tolylene diisocyanate 3 [mol], or isocyanurate which is cycloaddition polymer of diisocyanate 3 [mol]. These polyisocyanates can be used for both or only one of the lower magnetic layer 2 and the upper magnetic layer 3. When using a polyisocianate for both of the layers, the amount of the polyicosianate for each of the layers may be identical or different.

The organic solvent used for the non-magnetic paint may be, for example, acetone, methyl ethyl ketone, methyl isobutyl ketone, cyclohexanone, and other ketones; methyl acetate, ethyl acetate, butyl acetate, methyl lactate, ethyl lactate, glycol monoethyl ether acetate, and other esters; ethyl ether, glycol dimethyl ether, glycol monoethyl ether, dioxane, tetrahydrofuran, and other ethers; benzene, toluene, xylene, and other aromatic hydrocarbons; methylene chloride, ethylene chloride, carbon tetrachloride, chloroform, ethylene chlorohydrin, dichlorobenzene, and other chlorinated hydrocarbons.

That is, the non-magnetic paint is prepared by dispersing or solving hybrid particles, binder, and other additives in an organic solvent and this non-magnetic paint is applied to one main surface of the non-magnetic support body 1 to form the lower non-magnetic layer 2.

On the other hand, the upper magnetic layer 1 is formed by applying a magnetic paint containing a magnetic powder and a binder as main contents, onto the lower non-magnetic layer 2.

As the magnetic powder, it is possible to use ferromagnetic iron oxide fine powder, Co-doped ferromagnetic iron oxide fine powder, ferromagnetic chrome dioxide fine powder, ferromagnetic alloy powder, or the like. The magnetic powder preferably has a needle ratio of 1 to 30 and more preferably not less than 4. Moreover, the magnetic powder preferably has an average length of 0.05 $\mu$m to 2.0 $\mu$m. Furthermore, when using a ferromagnetic alloy powder as the magnetic powder, it is preferable that the metal powder be not less than 50 wt % and the 80 wt % or more of the metal powder is a ferromagnetic metal (i.e., Fe, Co, Ni, Fe—Ni, Co—Ni, Fe—Co—Ni). Moreover, it is preferable that the ferromagnetic alloy powder be made from fine particles having a longer diameter of about 0.5 $\mu$m or below.

As the binder used in the upper magnetic layer 1, it is possible to use a conventional known thermoplastic resins, thermo-hardening resin, radioactive radiation bridged resin formed by applying electron rays, and a mixture of these. The thermoplastic resin preferably has a softening temperature of 150° C. or below, an average molecular mass of 10000 to 200000, and polymerization degree of about 150 to 2000. More specifically, the thermoplastic resin may be, for example, vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic acid ester-acrylonitrile copolymer, methacrylic acid ester-vinylidene chloride copolymer, methacrylic acid ester-styrene copolymer, polyester polyurethane resin, polycarbonate polyurethane resin, polyvinyl fluoride, vinylidene chloride-acrylonitrile copolymer, butadiene-acrylonitrile copolymer, polyamide resin, polyvinyl butyral, cellulose derivative (cellulose acetate butyrate, cellulose diacetate, cellulose triacetate, cellulose propionate, nitrocellulose, and the like), styrene-butadiene copolymer, polyester resin, various synthetic rubber thermoplastic resins (polybutadiene, polychloroprene, polyisopurene, styrene-butadiene copolymer, and the like), and mixtures of these materials.

The non-magnetic paint and the magnetic paint are prepared by using a kneading apparatus and a dilution dispersion apparatus. The kneading apparatus is used in a kneading step for dispersing a magnetic powder of a comparatively high massive component, in a mixture containing a binder with a high shear. Moreover, the dilution dispersion apparatus is used in a dilution dispersion step for dispersing a magnetic powder of a comparatively low massive component, in a mixture containing a binder with a shock force of beads or the like.

The kneading apparatus and the dilution dispersion apparatus may be conventional known apparatuses. More specifically, the kneading apparatus may be a continuous double shaft kneading apparatus (extruder), co-kneader, pressurized kneader, or the like. Moreover, the dilusion dispersion apparatus may be a vertical type sand mill, a lateral type sand mill, a spike mill, pearl mill, double cylinder pearl mill.

Furthermore, the non-magnetic paint prepared is applied onto one main surface of the non-magnetic support body 1 using, for example, a reverse roll, a gravure roll, air doctor coater, blade coater, air knife coater, squeeze coater, impregnation coater, transfer roll coater, kiss coater, cast coater, spray coater, and the like.

After this, a magnetic paint is applied onto the non-magnetic paint. Here, the magnetic paint may be applied onto the non-magnetic paint applied onto the non-magnetic support body 1 when the non-magnetic paint is already dried or while the non-magnetic paint is still in a wet state. When applying the magnetic paint while the non-magnetic paint applied onto the non-magnetic support body 1 is in a set state, it is preferable to simultaneously apply the non-magnetic paint and the magnetic paint onto the non-magnetic support body in two layers. When performing the simultaneous double-layer application, for example, a dye coater is used.

In the magnetic recording medium having the aforementioned configuration, hybrid particles are added to the lower non-magnetic layer 2. The hybrid particles include non-magnetic pigment whose surface has an area coated by a graphite-shaped crystal of carbon black. Since the lower non-magnetic layer 2 can conduct electricity by the added hybrid particles, the lower non-magnetic layer 2 exhibits a low electric resistance. Accordingly, this magnetic recording medium has an excellent charge preventing effect and can prevent attachment and running defect due to electric charging. Consequently, this magnetic recording medium can be produced with an excellent yield. Moreover, this magnetic recording medium can prevent deterioration of the electromagnetic conversion characteristic and deterioration of running durability due to a discharge noise and dusts involved. Thus, this magnetic recording medium exhibits an excellent electromagnetic characteristic. Even when the magnetic recording medium is made into a disc shape and contained in a pair of shells having a liner inside, the magnetic recording medium is not charged by sliding of the liner and shell, preventing generation of a noise and off-track.

In order to verify the aforementioned, a non-magnetic paint added with carbon black is compared to a non-magnetic paint added by hybrid particles. It should be noted that in this verification two types of carbon black were used: 'carbon A' having a small primary particles diameter and a small specific area and 'carbon B' having a greater primary diameter and a greater specific area.

Figure 2:
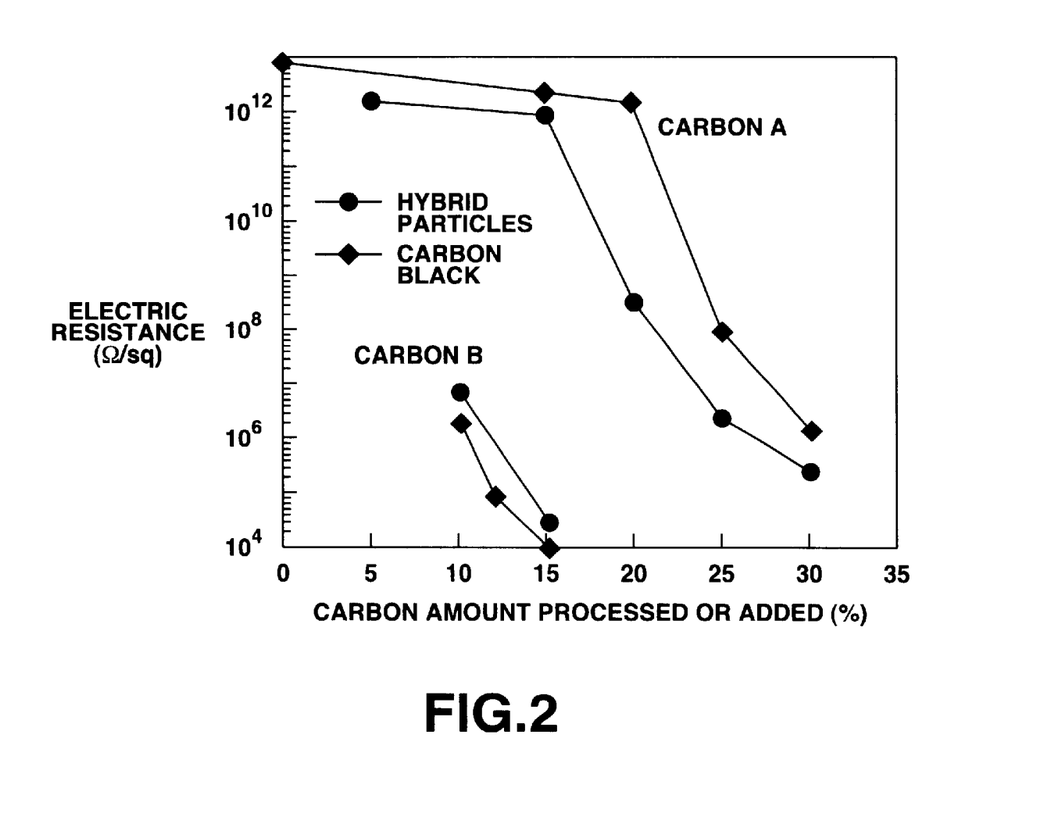
FIG. 2 shows the relationship of the amount of the carbon black processed and the carbon black added with the electric resistance of the lower non-magnetic layer.

FIG. 2 shows a relationship between the amount of the carbon black added or processed and the electric resistance of the magnetic recording medium.

As is clear from FIG. 2, when the hybrid particles are added to the lower non-magnetic layer, the electric resistance of the magnetic recording medium is reduced almost similarly when carbon black is added to the lower non-magnetic layer 2. Especially when carbon A is used, identical electrical resistance reduction effect can be obtained with a smaller processing amount than the amount added when carbon A is solely used. Moreover, the hybrid particles using carbon B can reduce the electric resistance with a smaller processing amount than the hybrid particles using carbon A. From this, it can be said that for effectively reducing the electric resistance, it is preferable to use a carbon black having a large primary particle diameter and a large specific area.

Thus, the lower non-magnetic layer 2 need not be added by a charge preventing agent such as carbon black for charge prevention as in the conventional example. For this, the non-magnetic paint constituting the lower non-magnetic layer 2 does not have a problem that the paint viscosity is increased due to a carbon black not dispersed. In other words, in this non-magnetic paint, in order to exhibit a charge preventing effect, only hybrid particles having an excellent dispersion characteristic are added. Since the lower non-magnetic layer 2 is formed from a highly dispersed non-magnetic paint, it can have an excellent surface characteristic. As a result, the upper magnetic layer 3 is highly smoothed. Consequently, this magnetic recording medium has little spacing loss and exhibits an excellent electromagnetic conversion characteristic.

Figure 3:
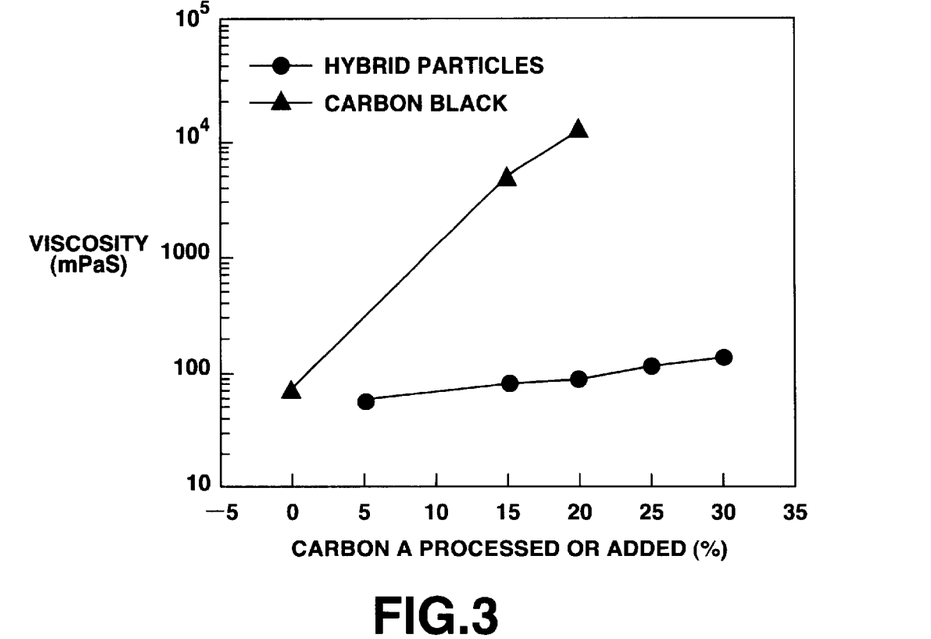
FIG. 3 shows the relationship of the amount of the carbon black processed and the carbon black added with the viscosity of the non-magnetic layer.
Figure 4:
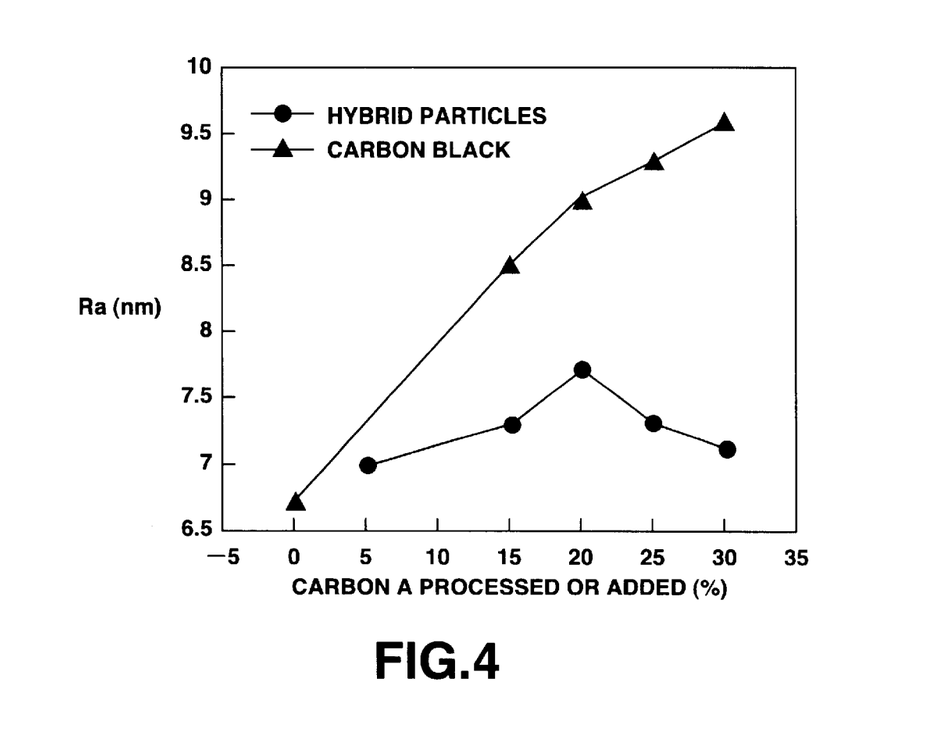
FIG. 4 shows the relationship of the amount of the carbon black processed and the carbon black added with the surface roughness.

In order to verify this, the non-magnetic paint viscosity and surface characteristic are compared between the non-magnetic paint added by a carbon black and the non-magnetic paint added by hybrid particles. FIG. 3 shows the relationship between the amount of carbon black added or processed and the non-magnetic paint viscosity. Moreover, FIG. 4 shows the relationship between the amount of carbon black added or processed and the surface roughness of the magnetic recording medium.

As is clear from FIG. 3, in the non-magnetic paint added by carbon black, the non-magnetic paint viscosity is increased depending on the amount of carbon black added. Moreover, as is clear from FIG. 4, the surface roughness is deteriorated depending on the amount of the carbon black added to the non-magnetic paint. Thus, when carbon black is added to reduce the electric resistance, the paint viscosity is increased due to carbon black not dispersed in the non-magnetic paint and it is impossible to obtain an excellent surface characteristic.

In contrast to this, when adding hybrid particles, as shown in FIG. 3, there is almost no interrelationship between the carbon black processing amount and the non-magnetic paint viscosity. Moreover, when adding hybrid particles, as shown in FIG. 4, there is no interrelationship between the carbon black processing amount and the surface roughness. Thus, even when the hybrid particles are prepared by increasing the carbon black processing amount in order to reduce the electric resistance, there is no problem of viscosity increase of the non-magnetic paint due to the hybrid particles and it is possible to obtain an excellent surface characteristic.

Moreover, the hybrid particles are preferably carbon black of low structure adhered mechanochemically. When a carbon black of low structure is used, it is possible to suppress the elasticity lowering of the lower non-magnetic layer 2 generated when hybrid particles are added to the lower non-magnetic layer 2. Accordingly, when a carbon black of low structure is used, it is possible to obtain a sufficient paint strength of the upper magnetic layer 3 and the lower non-magnetic layer 2 as well as an excellent running durability.

Figure 5:
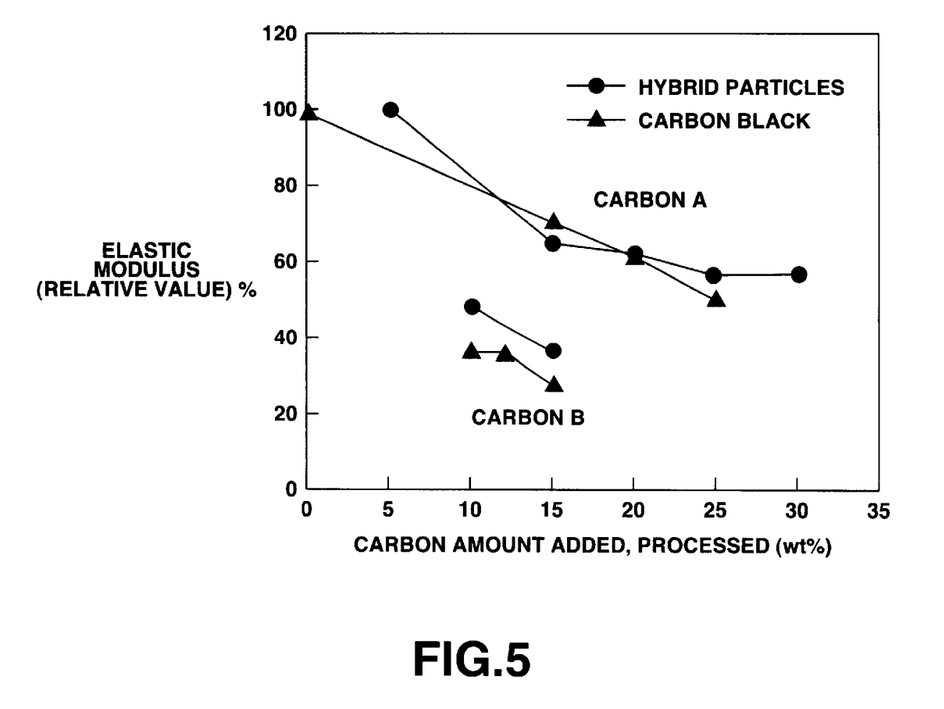
FIG. 5 shows the relationship of the amount of the carbon black processed and the carbon black added with the elasticity (Young's modulus) of the lower non-magnetic layer.

In order to verify this, hybrid particles using the aforementioned carbon A and hybrid particles using carbon B were compared to each other. FIG. 5 shows relationship of the carbon A processing amount in the hybrid particles and carbon B processing amount in the hybrid particles with the elasticity of the lower non-magnetic layer 2. It should be noted that FIG. 5 also shows the relationship between the carbon black addition amounts and the elasticity of the lower non-magnetic layer 2 when carbon A and carbon B are added solely to the lower non-magnetic layer 2.

As is clear from FIG. 5, the hybrid particles using carbon A can suppress lowering of the elasticity compared to the hybrid particles using carbon B. Accordingly, when the hybrid particles using carbon A are added, the magnetic recording medium can have an excellent running durability. In other words, when using a carbon black of low structure, i.e., carbon black having a small primary diameter and a small specific area, it is possible to suppress the elasticity lowering of the lower non-magnetic layer 2 and to obtain a sufficient paint film strength.

Moreover, it can be seen from FIG. 5 that when the amount of carbon black added solely is identical to the carbon black processing amount in the hybrid particles, addition of the hybrid particles has a greater effect to suppress the elasticity lowering of the lower non-magnetic layer 2. Accordingly, when the hybrid particles are used, it is preferable to obtain a more excellent running durability compared to the case when the carbon black is used solely.

EXAMPLES

Hereinafter, the present invention will be explained through specific examples but the present invention is not to be limited to the examples. Firstly, the effect of the aforementioned hybrid particles was examined as Experiment 1.

Experiment 1

Example 1

Firstly, in Example 1, hybrid particles were prepared using a needle-shaped $\alpha$-$Fe_2O_3$ particles as a non-magnetic pigment and Black Peals-L (trade named, referred to as A in Table 1) produced by Cabot Co., Ltd. as the carbon black. It should be noted that the Black Peals-L had an average primary particle diameter of 21 nm, a specific area of 130 $m^2/g$, a DBP oil absorption amount of 66 ml/100 g. Moreover, the needle-shaped $\alpha$-$Fe_2O_3$ particles had a specific area of 55 $m^2/g$, an average longer axis length of about 0.15 $\mu$m, and a longer axis/shorter axis ratio of about 10.

Here, the specific area was obtained by the BET method using the Rapid Surface Area Analyzer (produced by Micrometrics Co., Ltd.). the longer axis length and the shorter axis length were calculated from a photograph of a transmission electron microscope (×100,000) and obtained as an average value of 200 points.

Next, the hybrid particles were used for preparing a non-magnetic paint by a kneading and dispersing process with the composition as follows under an optimal condition.

| <Non-magnetic paint composition> | |
| --- | --- |
| Hybrid particles | 100 weight parts |
| Polyvinyl chloride resin | 15 weight parts |
| (MR-110 produced by Nippon Zeon Co., Ltd.) | |
| Polyester polyurethane resin | 10 weight parts |
| (UR-8200 produced by Toyobo co., Ltd.) | |
| Fatty acid ester | 5 weight parts |
| Fatty acid (myristic acid) | 2 weight parts |
| Methylethyl ketone | 100 weight parts |
| Cyclohexanone | 100 weight parts |

Moreover, besides the non-magnetic paint, a magnetic paint was prepared with a composition as follows.

| <Magnetic paint composition> | |
| --- | --- |
| $\alpha$-Fe metal magnetic powder | 100 weight parts |
| Polyvinyl chloride resin | 10 weight parts |
| (MR-110 produced by Nippon Zeon Co., Ltd.) | |
| Polyester polyurethane resin | 10 weight parts |
| (UR-8200 produced by Toyobo Co., Ltd.) | |
| $\alpha$-$Al_2O_3$ | 5 weight parts |
| (having an average particle diameter of 0.3 $\mu$m) | |
| Stearic acid | 1 weight part |
| Methylethyl ketone | 150 weight parts |
| Cyclohexanone | 150 weight parts |

The $\alpha$-Fe metal magnetic powder used here had a magnetic characteristic and a powder characteristic as follows:

Saturation magnetization amount=155 $Am^2/kg$

Coercive force=190 kA/m

Specific area=56 $m^2/g$

Needle ratio=6

The non-magnetic paint and the magnetic paint thus prepared were simultaneously double-applied onto a PET (polyethylene terephthalate) film having a thickness of about 60 $\mu$m using a 4-lip type dye coater and subjected to an orientation/drying process. After this, the non-magnetic paint and the magnetic paint were applied similarly onto the other side and subjected to the orientation and drying process. After this, calendar and hardening process were performed. Then, a 3.5-inch disc was punched out to obtain a sample disc. It should be noted that the paint layer thickness was as follows: the upper magnetic layer had a thickness of about 0.2 $\mu$m and the lower non-magnetic layer had a thickness of about 2.0 $\mu$m on both sides of the disc, and the thickness ratio of the upper magnetic layer/lower non-magnetic layer was set to 10.

Examples 2 to 9

Examples 2 to 9 of the magnetic recording medium were prepared in the same way as Example 1 except for that the type of the carbon black used and the carbon black processing amount were specified as shown in Table 1. It should be noted that the sample using Ketjen-EC (trade name) produced by Lion Akzo Co., Ltd as the carbon black is referred to as the carbon black type 'B' in Table 1. The Ketjen-EC has an average primary particle diameter of 30 nm, a specific area of 950 $m^2/g$, and a DBP oil absorption amount of 350 ml/100 g.

Comparative Example 1

A magnetic recording medium was prepared in the same way as Example 1 except for that no surface processing using carbon black was performed and the needle-shaped $\alpha$-$Fe_2O_3$ particles were used solely.

Comparative Examples 2 to 8

Comparative examples 2 to 8 of magnetic recording medium were prepared in the same way as Example 1 except for that the carbon black was used solely.

In these Examples and Comparative examples, the obtained non-magnetic paints and the sampling discs were checked in: the non-magnetic paint viscosity, elasticity (Young's modulus) of the two-layered film consisting of the lower non-magnetic layer and the upper magnetic layer, disc surface roughness, surface electric resistance, electromagnetic conversion characteristic (output), and running durability.

The non-magnetic paint viscosity was measured using the E-type viscosity meter produced by Toei Seiki Co., Lid. at a shear speed of 5.0 $s^{-1}$. The surface roughness was measured using an optical interference type roughness meter (ZYGO produced by HP) and evaluated at the center surface average roughness Sra. The electric resistance was measured using 2-pole type surface electric resistance meter (High Resistance Meter produced by YHP). As for the electromagnetic conversion characteristic, a recording/reproduction output at 3600 rpm and 120 kfci was measured and calculated into a relative value with respect to the sampling disc of Example 1 as 100%. The Yung's modulus of the two-layered paint film was measured using a pulling test apparatus (Shimadzu autograph AG-100D) and calculated according to an equation given below by subtracting the Young's modulus of the base film alone from the two-layered paint film having the base film. The measurement was performed using five samples and an average value was calculated from the three samples excluding the maximum and the minimum values.

$$Em*Tm=Et*(Tm+Tb)-Eb*Tb$$

Wherein Et: sheet Young's modulus (measured value)

Em: paint film elasticity

Tm: paint film thickness

Eb: base elasticity

Tb: base thickness

The running durability was checked performing successive reproduction of one and the same track to determine the number of passes until the output is lowered by 6 dB with respect to the initial value. The running durability is evaluated as good when the number of passes is not less than 40 millions (about 185 hours).

The results are shown in Table 1.

TABLE 1

| | Carbon black type | Processed or added amount (wt %) | Viscosity (mPaS) | Surface roughness (SRa) |
|---|---|---|---|---|
| Example 1 | A | 5 | 56 | 3.5 |
| Example 2 | A | 15 | 82 | 3.7 |
| Example 3 | A | 20 | 90 | 3.9 |
| Example 4 | A | 25 | 115 | 3.7 |
| Example 5 | A | 30 | 138 | 3.6 |
| Example 6 | A | 40 | 225 | 4 |
| Example 7 | A | 50 | 562 | 5 |
| Example 8 | B | 10 | 6205 | 4.2 |
| Example 9 | B | 15 | 9856 | 5.3 |
| Comparative example 1 | — | 0 | 74 | 3.4 |
| Comparative example 2 | A | 15 | 4838 | 4.3 |
| Comparative example 3 | A | 20 | 12390 | 5.5 |
| Comparative example 4 | A | 25 | Could not be measured | 5.7 |
| Comparative example 5 | A | 30 | Could not be measured | 5.8 |
| Comparative example 6 | B | 10 | 12608 | 6 |
| Comparative example 7 | B | 12 | 18304 | 6.6 |
| Comparative example 8 | B | 15 | 20020 | Could not be measured |

| | Electric resistance ($\Omega$/sq) | Electromagnetic conversion characteristic output | Young's modulus (GPa) | Running durability ($\times$ 10 thousand passes) |
|---|---|---|---|---|
| Example 1 | $1.6 \times 10^{12}$ | 100 | 11.5 | 1700 |
| Example 2 | $8.8 \times 10^{11}$ | 97 | 7.5 | >4000 |
| Example 3 | $3.3 \times 10^{8}$ | 94 | 7.1 | >4000 |
| Example 4 | $2.2 \times 10^{6}$ | 97 | 6.5 | >4000 |
| Example 5 | $2.4 \times 10^{5}$ | 99 | 6.5 | >4000 |
| Example 6 | $1.2 \times 10^{5}$ | 91 | 5.9 | >4000 |
| Example 7 | $8.0 \times 10^{4}$ | 85 | 4.8 | 3800 |
| Example 8 | $7.3 \times 10^{6}$ | 89 | 4.6 | 3100 |
| Example 9 | $2.8 \times 10^{4}$ | 71 | 4.2 | 2400 |
| Comparative example 1 | $7.5 \times 10^{13}$ | 102 | 11.4 | Defective running |
| Comparative example 2 | $2.0 \times 10^{12}$ | 88 | 8.1 | Defective running |
| Comparative example 3 | $1.4 \times 10^{12}$ | 74 | 7.1 | 1800 |
| Comparative example 4 | $8.8 \times 10^{7}$ | 71 | 5.8 | >4000 |
| Comparative example 5 | $1.2 \times 10^{6}$ | 69 | Could not be measured | Could not be measured |
| Comparative example 6 | $1.9 \times 10^{6}$ | 60 | 4.2 | 2200 |
| Comparative example 7 | $9.0 \times 10^{4}$ | 51 | 4.1 | 1800 |
| Comparative example 8 | $1.1 \times 10^{4}$ | Could not be measured | 3.2 | 160 |

As is clear from Table 1, Comparative example 1 having the lower non-magnetic layer containing only conventional $\alpha$-$Fe_2O_3$ could not reduce the electric resistance and as a result, caused a running failure. Moreover, in Comparative examples 2 to 8 having the lower non-magnetic layer containing carbon black, the viscosity of the non-magnetic paint was increased and the surface roughness was increased as well. For this, in Comparative examples 2 to 8, the electromagnetic conversion characteristic was not preferable and the Young's modulus of the lower non-magnetic layer showed a defective value.

In contrast to this, in the samples of Examples 1 to 9 having the lower non-magnetic layer containing hybrid particles, it was possible to greatly reduce the electric resistance as compared to Comparative example 1 and to obtain an excellent running durability. Moreover, in Examples 1 to 9, it was possible to suppress the viscosity of the non-magnetic layer as compared to Comparative examples 2 to 9, which enabled to obtain an excellent surface roughness. For this, Examples 1 to 9 exhibited an excellent electromagnetic conversion characteristic.

Moreover, in Example 1 in which the processed amount of carbon black was 5 wt %, the effect to reduce the electric resistance is comparatively small. In Example 7 in which the processed amount of carbon black was 50 wt %, the non-magnetic paint shows a comparatively high viscosity. In contrast to this, in Examples 2 to 6 in which the processed amount of carbon black was 10 wt % to 40 wt %, the electric resistance was sufficiently reduced and the non-magnetic paint could maintain the viscosity at a low value. Accordingly, the processed amount of carbon black is preferably in a range of 10 wt % to 40 wt %.

Furthermore, when comparing Examples 1 to 7 with Examples 8 and 9, it can be seen that those using the Black Peals-L having a small primary particle diameter and a small specific area have a higher effect to suppress the viscosity of the non-magnetic paint, and on the contrary, those using the Ketjen-EC having a great primary particle diameter and a great specific area have a higher effect to reduce the electric resistance. Thus, by selecting a primary particle diameter and a specific area, it is possible to suppress the non-magnetic paint viscosity at a low value to obtain an excellent viscosity and improve the electromagnetic conversion characteristic or to reduce the electric resistance to improve the running durability.

Next, as Experiment 2, a preferable thickness of the lower non-magnetic layer was examined.

Experiment 2

Examples 10 to 17

In Examples 10 to 17, samples of magnetic recording medium were prepared in the same way as in Example 4 except for that the thickness of the lower non-magnetic layer was specified as shown in Table 2.

Examples 10 to 17 thus prepared were checked in the same way as Experiment 1 in the elasticity of the two-layered paint, the disc surface roughness, surface electric resistance, electromagnetic conversion characteristic, and running durability. The results are show in Table 2.

TABLE 2

| | Carbon black type | Lower non-magnetic layer thickness (μm) | Surface roughness (SRa) | Electric resistance (Ω/sq) |
|---|---|---|---|---|
| Example 10 | A | 0.2 | 4.2 | $1.7 \times 10^{12}$ |
| Example 11 | A | 0.5 | 4.0 | $6.7 \times 10^{6}$ |
| Example 12 | A | 1.0 | 3.8 | $3.3 \times 10^{6}$ |
| Example 13 | A | 1.5 | 3.7 | $2.2 \times 10^{6}$ |
| Example 14 | A | 2.0 | 3.5 | $1.7 \times 10^{6}$ |
| Example 15 | A | 3.0 | 3.3 | $1.1 \times 10^{6}$ |
| Example 16 | A | 0.1 | 5.2 | $4.0 \times 10^{7}$ |
| Example 17 | A | 4.0 | 3.4 | $8.5 \times 10^{5}$ |

| | Electromagnetic conversion characteristic output | Young's modulus (GPa) | Running durability (× 10 thousand passes) |
|---|---|---|---|
| Example 10 | 89 | 15.0 | 3000 |
| Example 11 | 92 | 11.1 | >4000 |
| Example 12 | 96 | 9.0 | >4000 |
| Example 13 | 97 | 6.5 | >4000 |
| Example 14 | 100 | 6.5 | >4000 |
| Example 15 | 103 | 5.6 | >4000 |
| Example 16 | 70 | 18.0 | >4000 |
| Example 17 | 102 | 4.7 | 3500 |

As is clear from Table 2, in Example 16 having a lower non-magnetic layer whose thickness is 0.1 μm, the surface roughness is 4.8 nm and the electromagnetic conversion characteristic is not satisfactory. In other words, in order to obtain an excellent electromagnetic characteristic, it is preferable that the thickness of the lower non-magnetic layer be 0.2 or above and the surface roughness be 4.2 nm or below.

Moreover, in Example 17 having a lower non-magnetic layer whose thickness is 4.0 μm, the Young's modulus of the two-layered paint film is 4.7 GPa and the running durability is not satisfactory. In other words, in order to improve the running durability, it is preferable that the thickness of the lower non-magnetic layer do no exceed 4.0 nm and the Young's modulus of the two-layered paint film be not less than 5.0 GPa.

As is clear from the above-given explanation, in the magnetic recording medium according to the present invention, the lower undercoat layer contains a non-magnetic pigment powder having a surface area coated by a graphite-shaped crystal of carbon black and accordingly, it is possible to sufficiently reduce the electric resistance of the lower undercoat layer. For this, in this magnetic recording medium, it is possible to significantly increase the running durability. Moreover, in this magnetic recording medium, it is possible to improve the surface characteristic of the lower undercoat layer and accordingly, it is possible to obtain an excellent electromagnetic conversion characteristic.

What is claimed is:

1. A magnetic recording medium comprising:

a non-magnetic support body;

a lower undercoat layer coating said non-magnetic support body and comprising a non-magnetic paint which comprises a binder and a non-magnetic powder; and an upper magnetic layer formed on the lower undercoat layer wherein, said non-magnetic powder includes a needle-shaped non-magnetic pigment whose surface has an area coated with graphite-shaped crystals of carbon black; and said non-magnetic powder is prepared by mechanochemical processing of said carbon black in an amount of 10 wt % to 40 wt % with respect to said non-magnetic pigment;

wherein said lower undercoat layer has a thickness in a range of 0.2 μm to 3.0 μm;

wherein said non-magnetic pigment is hematite (a -Fe2O3);

wherein said carbon black has an average primary particle diameter not exceeding 80 nm and a DBP oil absorption amount not exceeding 180 ml/100 cc wherein said undercoat layer has centerline average surface roughness of 4.2 nm or less; and wherein said lower undercoat layer and said upper magnetic layer together have a Young's modulus of 5.0 GPa to 15.0 GPa at room temperature.

* * * * *